P. W. STANHOPE, Jr.
Pitman-Connection.
No. 227,393. Patented May 11, 1880.
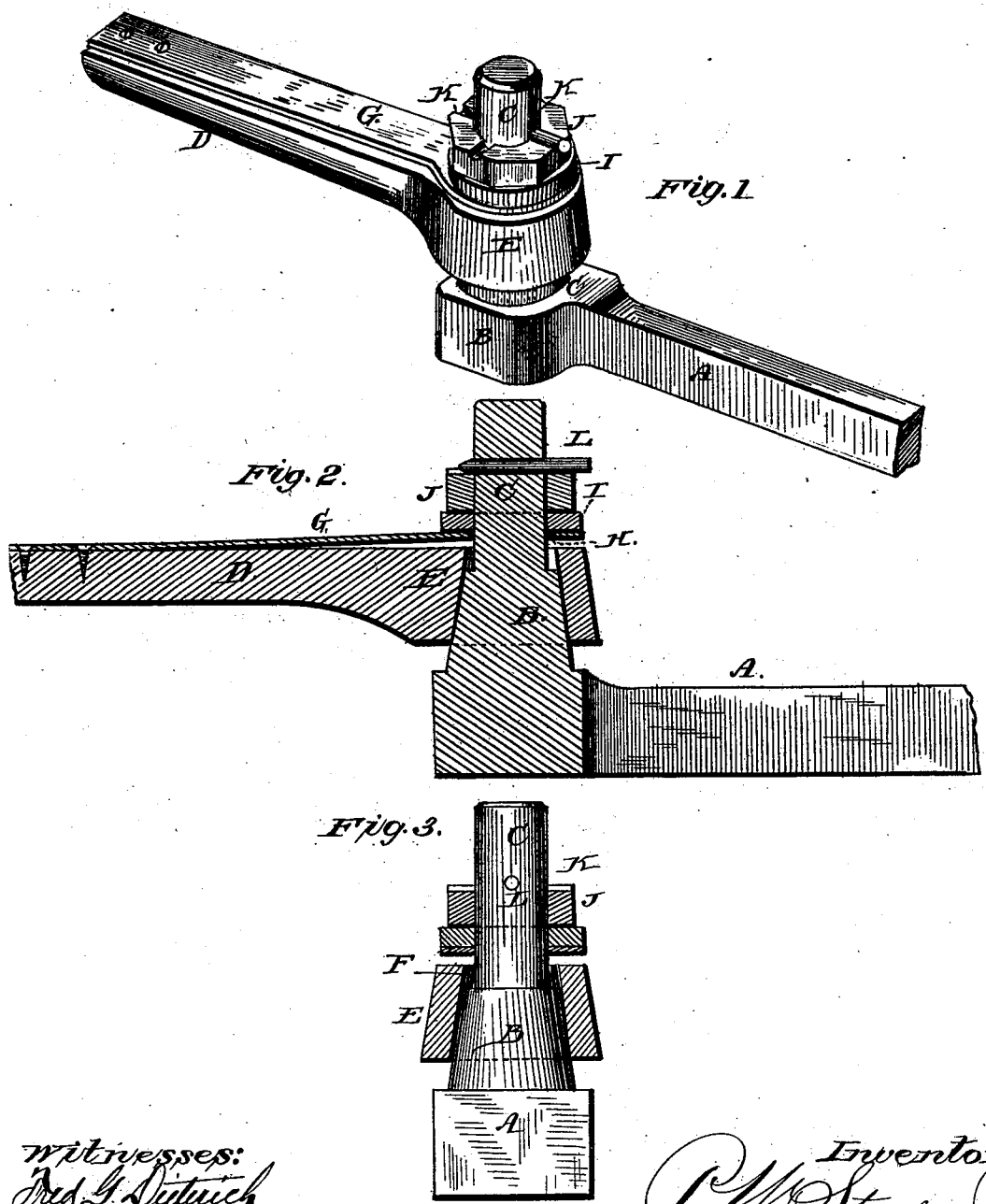

United States Patent Office.

PHILIP W. STANHOPE, JR., OF COVINGTON, KENTUCKY.

PITMAN-CONNECTION.

SPECIFICATION forming part of Letters Patent No. 227,393, dated May 11, 1880.

Application filed October 22, 1879.

*To all whom it may concern:*

Be it known that I, PHILIP W. STANHOPE, Jr., of Covington, in the county of Kenton and State of Kentucky, have invented certain new and useful Improvements in Pitman-Connections; and I do hereby declare that the following is a full, clear, and exact description thereof, which will enable others skilled in the art to which it appertains to make and use the same, reference being had to the accompanying drawings, which form a part of this specification.

This invention relates to pitman-connections; and it consists in certain improvements in the construction of the same, which will be hereinafter more fully described, and particularly pointed out in the claim.

In the accompanying drawings I have shown my invention applied to the cutter-bar of a harvesting-machine; but this is merely for purposes of illustration, and I desire it to be understood that I do not limit myself to any particular application of the device.

Figure 1 is a perspective view. Fig. 2 is a longitudinal sectional view, and Fig. 3 is a cross-section.

Corresponding parts in the several figures are denoted by like letters of reference.

My invention has for its object to compensate for the wear upon the pitman-connection, and I accomplish this by the arrangement of a spring pressing upon the pitman and holding the latter in permanent contact with its bearing, as will be hereinafter described.

A represents the heel of the cutter-bar, which is provided with a cone, B, terminating in a solid bolt, C. D represents the end of the pitman, which has a conical recess or bearing, E, for the cone B, a perforation, F, being provided at the bottom of said recess for bolt C. Upon the upper side of the pitman is riveted or otherwise secured a spring, G, having at its free end a perforation, H, fitting over bolt C. The tension of the free end of spring G is upward against the washer I, interposed between it and the nut J. The upper side or face of nut J is provided with several diametrical grooves, K, for the accommodation of the linchpin or fastening L, which passes transversely through the bolt, thereby preventing the nut from coming off.

In operation the wear upon the conical bearing is compensated for by the pressure of spring G, which takes up the slack and prevents the joint from rattling.

Having thus described my invention, I claim and desire to secure by Letters Patent of the United States—

The combination of the heel-plate A, having cone B and bolt C, pitman D, having conical recess E, perforation F, and spring G, the washer I, nut J, having grooves K, and pin L, all arranged and operating substantially as and for the purpose herein shown and specified.

In testimony that I claim the foregoing as my own I have hereto affixed my signature in presence of two witnesses.

PHILIP W. STANHOPE, JR.

Witnesses:
W. P. McLAUGHLIN,
JNO. GILLIGAN.